(12) United States Patent
Tagesson

(10) Patent No.: US 10,293,834 B2
(45) Date of Patent: May 21, 2019

(54) METHOD FOR ESTIMATION OF A TRAILER WHEELBASE LENGTH

(71) Applicant: VOLVO TRUCK CORPORATION, Göteborg (SE)

(72) Inventor: Kristoffer Tagesson, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 612 days.

(21) Appl. No.: 14/437,866

(22) PCT Filed: Oct. 31, 2012

(86) PCT No.: PCT/SE2012/000173
§ 371 (c)(1),
(2) Date: Apr. 23, 2015

(87) PCT Pub. No.: WO2014/070047
PCT Pub. Date: May 8, 2014

(65) Prior Publication Data
US 2015/0291179 A1    Oct. 15, 2015

(51) Int. Cl.
*G01B 5/00*     (2006.01)
*B60W 40/12*    (2012.01)
(Continued)

(52) U.S. Cl.
CPC .......... *B60W 40/12* (2013.01); *B60W 40/105* (2013.01); *B60W 40/114* (2013.01);
(Continued)

(58) Field of Classification Search
CPC .......... B60W 2520/14; B60W 40/114; B60W 40/12; B60W 40/105; G01B 21/06
See application file for complete search history.

(56) References Cited

U.S. PATENT DOCUMENTS 5,813,487 A    9/1998  Lee et al.
6,301,548 B1 * 10/2001 Gerum ................ B60T 8/1708
                                                   702/158
(Continued)

FOREIGN PATENT DOCUMENTS

EP    0308263 A2    3/1989
EP    0798615 A1   10/1997
(Continued)

OTHER PUBLICATIONS

International Search Report (dated Jul. 22, 2013) for corresponding International Application PCT/SE2012000173.
(Continued)

*Primary Examiner* — Stephanie E Bloss
(74) *Attorney, Agent, or Firm* — WRB-IP LLP

(57) ABSTRACT

A method is provided for estimating the effective wheelbase length of a trailer in a vehicle combination including a towing vehicle and at least one towed trailer. The method includes driving the vehicle combination forwards, determining the speed of the vehicle combination, determining the steering angle of the towing vehicle, determining the steering angle of each towed trailer, determining the yaw rate of the towing vehicle and the yaw rate of the towed trailer or determining the articulation angle for each towed trailer, and using the determined values to calculate a value for the effective wheelbase for each towed trailer. An arrangement for estimating the effective wheelbase length of a trailer in a vehicle combination is also disclosed.

14 Claims, 2 Drawing Sheets

(51) Int. Cl.
*B62D 13/06* (2006.01)
*B62D 15/02* (2006.01)
*G01B 21/06* (2006.01)
*G01B 21/16* (2006.01)
*B60W 40/105* (2012.01)
*B60W 40/114* (2012.01)

(52) U.S. Cl.
CPC ........... *B62D 13/06* (2013.01); *B62D 15/027* (2013.01); *G01B 5/0025* (2013.01); *G01B 21/06* (2013.01); *G01B 21/16* (2013.01); *B60W 2520/14* (2013.01)

(56) References Cited

U.S. PATENT DOCUMENTS

| | | | | |
|---|---|---|---|---|
| 8,675,953 | B1* | 3/2014 | Elwell | G06T 7/593 348/159 |
| 10,127,459 | B2* | 11/2018 | Hu | G06K 9/00791 |
| 2005/0055138 | A1* | 3/2005 | Lee | G05D 1/0891 701/1 |
| 2006/0206253 | A1* | 9/2006 | Yu | B62D 6/002 701/70 |
| 2006/0235589 | A1 | 10/2006 | Deng et al. | |
| 2006/0244579 | A1* | 11/2006 | Raab | B60T 8/1708 340/438 |
| 2007/0152424 | A1 | 7/2007 | Deng et al. | |
| 2009/0005932 | A1* | 1/2009 | Lee | B60D 1/30 701/41 |
| 2009/0095562 | A1 | 4/2009 | Yasui et al. | |
| 2011/0181457 | A1* | 7/2011 | Basten | G01B 7/042 342/70 |
| 2012/0046806 | A1 | 2/2012 | Yokota et al. | |
| 2012/0221168 | A1* | 8/2012 | Zeng | G08G 1/09626 701/1 |
| 2014/0188344 | A1* | 7/2014 | Lavoie | B60W 30/00 701/41 |
| 2014/0277942 | A1* | 9/2014 | Kyrtsos | G01B 21/02 701/41 |
| 2014/0297129 | A1* | 10/2014 | Lavoie | B62D 13/06 701/41 |
| 2015/0291179 | A1* | 10/2015 | Tagesson | G01B 21/16 702/158 |

FOREIGN PATENT DOCUMENTS

| | | | |
|---|---|---|---|
| EP | 2324323 B1 | 5/2011 | |
| GB | 2398047 A | 8/2004 | |
| WO | 2007055681 A2 | 5/2007 | |
| WO | WO2010022806 | * 3/2010 | ............. B60T 8/172 |

OTHER PUBLICATIONS

International Preliminary Report on Patentability (dated Oct. 29, 2014) for corresponding international Application PCT/SE2012/000173.

* cited by examiner

METHOD FOR ESTIMATION OF A TRAILER WHEELBASE LENGTH

BACKGROUND AND SUMMARY

The present invention relates to a method for estimating the wheelbase length of at least one trailer of a vehicle combination comprising a towing vehicle and at least one towed trailer. The method is especially suited for vehicle combinations having more than one towed trailer.

In order to reduce the number of heavy vehicles on the roads, longer vehicle combinations comprising more than one towed trailer are proposed for the use on regular roads in some countries. Apart from reducing the required number of towing vehicles for a specific load, the energy consumption and the emission of exhaust gases will also be reduced compared with traditional vehicle combinations. Normally, the length and the weight of the vehicle combination are controlled by law and regulations. One vehicle combination that at the moment is allowed in some European countries is a truck-dolly-semitrailer combination, which is slightly longer than a normal truck-trailer combination. Such a combination allows a truck to tow a semitrailer using a small trailer often referred to as a dolly or dolly trailer. A dolly is a small trailer that can be coupled to a truck or trailer in order to support a semi-trailer. The dolly is equipped with a fifth wheel to which the semi-trailer is coupled.

In some countries, longer and/or heavier vehicle combinations are also allowed under restricted conditions. Such vehicles may comprise several trailers and may be over 50 meters long and more. They are often used in remote areas and for specific purposes. In Australia, road trains comprising more than 4 trailers are used in some states and on some roads. Longer combination vehicles (LCV's) are also used in e.g. USA, Canada and Argentina. All these LCV's are used under strict regulations.

One problem that may arise when longer and varying vehicle combinations are used, is to determine the effective wheelbase of each towed trailer. Knowledge of the effective wheelbase is e.g. advantageous to have when slow speed driving of the vehicle combination is to be assisted by an autonomous or semi-automatic function, e.g. when marshalling, in order to simplify the positioning of the vehicle combination at a loading ramp. It is especially important to know the effective wheelbase when automatic or semi-automatic reversing is to be implemented.

The effective wheelbase is a well-known expression. When a vehicle is provided with more than one axle at one end, these axles can be approximated with only one virtual axle. A vehicle having only this virtual axle would in the ideal case behave almost exactly in the same way as the original vehicle with more axles. For a vehicle combination, i.e. a towing vehicle followed by one or several towed units, each vehicle unit will thus have one effective wheelbase. In FIG. 1, a vehicle combination 1 comprising a truck 2, a dolly 3 and a semitrailer 4 is shown. The effective wheelbase is the distance between the connection point of the trailer and the virtual wheel axle. For the dolly 3, the effective wheelbase is the distance L2 between the trailer coupling 5 and the virtual axle 6 of the dolly, which is derived from the regular axles 7 of the dolly. For the semitrailer 4, the effective wheelbase is the distance L3 between the kingpin 8 of the semitrailer and the virtual axle 9 of the semitrailer, which is derived from the regular axles 10 of the semitrailer. In FIG. 1, the virtual wheel axles are shown with dashed lines.

The easiest way of determining the effective wheelbase of a trailer is to measure the distance from the connection point to the wheel axles and to determine the tyre characteristic and the axle loads. The effective wheelbase can then be calculated using available explicit formulas. This may be a reliable method when the same trailer is used exclusively and is running with the same load, or when trailer axle longitudinal position, tyre properties and load is continuously made available to all control units that require the information. In reality this is most often not the case. The effective wheelbase, i.e. the position of the virtual axle, is dependent on each axle load and the tyre characteristics, which means that the effective wheelbase may vary depending on how the trailer is loaded. Further, for a trailer having a liftable axle, the wheelbase will change when the axle is raised.

U.S. Pat. No. 6,301,548 discloses a method for determining the wheelbase of steerable vehicles when cornering, in which the wheelbase is determined from at least one defined track width, measured wheel circumference speeds and/or measured steering angles. In this method, the radius of the curve is used as an input to the method which means that the vehicle must drive through a curve with a constant radius.

EP 2 324 323 B1 discloses a method for determining a wheelbase of a vehicle having at least two axles by which measurement signals of the vehicle are recorded at least during travel of the vehicle through a curve, and where the wheelbase is determined from at least the measured signals. A yaw rate and the rotational speeds of the wheels for determining the wheel speeds are measured and the wheelbase is determined from geometrical calculations. In this method, the radius of the curve is used as an input to the method which means that the vehicle must drive through a curve with a constant radius.

These methods are mainly adapted to determine the wheelbase for a vehicle combination comprising one towing vehicle and one towed trailer driving through a continuous curve. There is thus still room for an improved method and arrangement adapted for vehicle combinations having at least one towed trailer and where steering is not restricted to steady state cornering.

It is desirable to provide an improved method for estimating the effective wheelbase length of a trailer in a vehicle combination comprising a towing vehicle and at least one towed trailer. It is also desirable to provide an improved arrangement for estimating the effective wheelbase length of a trailer in a vehicle combination comprising a towing vehicle and at least one towed trailer.

In a method for estimating the effective wheelbase of a trailer in a vehicle combination comprising a towing vehicle and at least one towed trailer, the steps of driving the vehicle combination forwards, recording the speed of the vehicle combination, recording the steering angle of the towing vehicle, recording the yaw rate of the towing vehicle and of the towed trailers or recording the articulation angle for each towed trailer, recording the steering angle of each towed trailer, and using the determined values to calculate a value for the effective wheelbase for each towed trailer are comprised.

By this first embodiment of the method, the method can estimate the effective wheelbase of the at least one towed trailer. The estimation of the effective wheelbase is done when the vehicle combination is driven forwards for a predetermined time interval, where the time interval may be between a few seconds up to several minutes. The duration of the time interval may e.g. depend on the type of road on which the vehicle combination is driven. Since the steering angles and the yaw rates and/or the articulation angles are used for the estimation, it is advantageous that the vehicle combination at least drives through one curved portion of the road. During the time interval, the different values are determined and recorded with a predetermined sample frequency, such that a series of recorded value sets, which may be arranged in matrixes, are obtained. One or more of these recorded value sets or matrixes are then used to calculate the effective wheelbase for the towed trailers of the vehicle combination.

It is possible to sort the value sets before the effective wheelbase is calculated. When the vehicle combination drives absolutely straight, the recorded values for e.g. the steering angles or the articulation angles of the towed trailers will be substantially zero, which means that there is no point in calculating an effective wheelbase using these value sets. Thus, such value sets can be discharged before the effective wheelbase is calculated. It is also possible that such values are not recorded. It is e.g. possible that some or all values are compared with threshold values before a value set is recorded. If one of the values is below or above the threshold level, the value set is not recorded. When the vehicle combination has traveled for the predetermined time interval, a number of value sets have been recorded. One or more of these value sets are used to calculate an effective wheelbase. It is possible to calculate a number of wheelbases using different value sets and to average these effective wheelbase values.

The estimation of the effective wheelbase is preferable done by fitting a vehicle model using a least square condition. In this way, the deviations in the used values are minimized. Deviations in the values may e.g. come from disturbances or noise in the measured signals. This may e.g. arise from the road conditions, which may not always be perfect. A pot hole may e.g. influence the yaw rate of the truck or the steering angle value of a trailer. Other types of road defects may also influence the estimation. By using a least square approximation, and by performing several estimations for different value sets, an effective wheelbase estimation that differ a few percent or less from the actual effective wheelbase value can be obtained.

The different recorded values are either obtained by measuring the values directly using sensors or by estimating the required values with the use of other measured signals.

One measure that can be estimated is the yaw rate. The yaw rates of the vehicles are e.g. coupled to the articulation angles of the following vehicles. The yaw rate of the first towed trailer can e.g. be approximated by using the yaw rate of the towing vehicle and adding the time derivative of the articulation angle between the towing vehicle and the first towed trailer.

The yaw rate of the towing vehicle can e.g. be determined either by estimation or by a measurement. The estimation may be done by using an estimation method based on vehicle combination properties, such as wheel speed of the vehicle, vehicle mass, vehicle length, steering angle etc. Yaw rate measurements are done by using a yaw rate sensor.

In an arrangement for estimating the effective wheelbase length of a trailer in a vehicle combination comprising a towing vehicle and at least one towed trailer, comprising means for obtaining the speed of the vehicle combination, means for obtaining the steering angle of the towing vehicle, means for obtaining the steering angle of each towed trailer, the arrangement further comprises means for obtaining the yaw rate of the towing vehicle and each towed trailer or for obtaining the articulation angle for each towed trailer, means for recording the obtained values in a data set, and means for calculating a value for the effective wheelbase for each towed trailer.

By this first embodiment of the arrangement, the arrangement comprises means for estimating the effective wheelbase of the at least one towed trailer. The estimation of the effective wheelbase is done by recording appropriate values obtained either by measurements or estimations when the vehicle combination is driven forwards during a time interval, where the time interval may be between a few seconds up to several minutes. The duration of the time interval may e.g. depend on the type of road on which the vehicle combination is driven. Since the steering angles, the yaw rate and/or the articulation angles are used for the estimation, it is advantageous that the vehicle combination at least drives through one curved portion of the road. However, the curve must not be continuous with a specified radius. During the time interval, the different values are determined and recorded with a predetermined sample frequency, such that a series of recorded value sets, which may be arranged in matrixes, are obtained. One or more of these recorded value sets or matrixes are then used to calculate the effective wheelbase for the towed trailers of the vehicle combination. The arrangement comprises means for calculating a value for the effective wheelbase, and the means preferably uses a least square fit to a one track linear vehicle model for the estimation of the effective wheelbase.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims.

Figure 1:
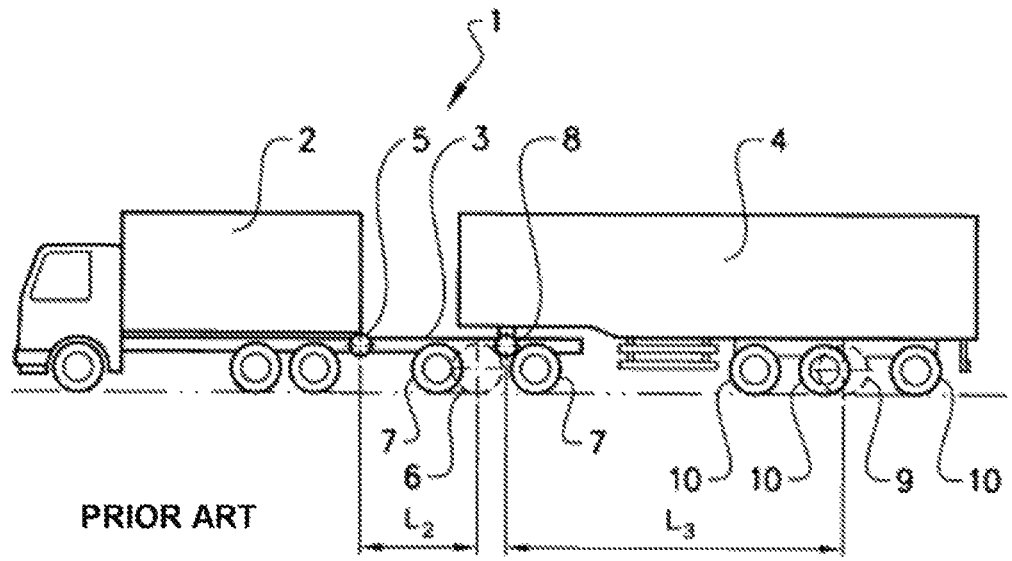
FIG. 1 shows a schematic vehicle combination comprising a towing vehicle and two towed trailers

FIG. 1 shows a schematic vehicle combination 1 comprising a towing vehicle 2 and two towed trailers 3, 4. The towing vehicle is preferably a regular truck adapted for commercial highway use, but could also be a tractor having a fifth wheel or a bus. The first towed trailer 3 is in the shown example a dolly having a drawbar connected to the trailer coupling of the truck. The dolly is provided with two wheel axles 7. The second towed trailer 4 is a semitrailer, which is provided with a kingpin 8 that is connected to the fifth wheel of the dolly. This example shows a common type of a longer vehicle combination, but it is also possible to estimate the effective wheelbase for other types of vehicle combinations having other types of towing vehicles and other types and numbers of towed vehicles.

One such example is a vehicle combination comprising a tractor and a regular trailer or a tractor, a semitrailer and a regular trailer. A regular trailer having both a front axle and one or several rear axles can be modelled as two towed trailers. The first towed trailer comprises the drawbar and the first axle and the effective wheel base extends from the drawbar connection to the front axle, or the virtual front axle if the trailer is provided with more than one front axle. The second towed trailer comprises the trailer body and the rear axle or axles, where the effective wheel base extends from the pivot point between the trailer body and the first axle to the virtual rear axle of the trailer.

In order to estimate the effective wheelbase for each towed trailer, a number of measures are recorded in value sets via suitable means such as a computer when the vehicle combination is driven forwards. The measures are preferably recorded when the conditions corresponds to certain predefined conditions, e.g. when the speed of the vehicle combination is within a predefined interval and when the road condition corresponds to a predefined road profile. It is e.g. advantageous to perform the recordings when the road is relatively even and plane. The time of a recording period is preferably within a predefined time interval, which may be a few seconds up to a number of minutes or more. The time period may either be preset or the recording may stop when a predefined number of approved value sets have been recorded. The recorded values are stored in a memory, preferably comprised in a control unit of the vehicle.

The measures that are recorded are the speed vx of the truck, the steering angle of the truck, the yaw rate ri of the truck, the steering angles $\delta_2 \delta_3$ of each trailer, the yaw rate r2, r3 of each trailer and the articulation angles $\varphi_2 \varphi_3$ of each trailer. The speed of the truck is measured in a conventional way, e.g. with a tachometer or a GPS. The steering angle of the truck is measured by a steering angle sensor. The yaw rate of the truck is either measured with a yaw rate sensor or estimated by using known truck properties. The steering angle of a trailer is the angle with which a steerable axle of the trailer steers, if the trailer is provided with a wheel steering function. The steering angle is measured by a steering angle sensor provided on the steerable axle of that trailer. The articulation angle for a trailer is the angle between the centre-line of the trailer to the centre-line of the vehicle ahead. The articulation angle is a measure of the articulation between the vehicles. The articulation angle may be measured with an articulation sensor mounted in the coupling between the vehicles or with another type of sensor. The articulation angle may e.g. be measured with optical sensors or by the use of a camera. The yaw rate of a trailer is either measured with a yaw rate sensor or is estimated by using e.g. the articulation angle.

When a suitable amount of value sets have been recorded, the effective wheelbase, L2 or L3, is calculated for each towed trailer via suitable means such as a computer. The effective wheelbase is preferably estimated by using a weighted least square approximation.

$$[L_2, L_3] = \arg\min_{L_2, L_3} \Sigma_{i=0}^N \{\|W_\varphi(\varphi_i - \varphi_t)\|^2 + \|W_r(r_i - P_i)\|^2\} \quad (1)$$

where $\varphi_t$ is a two elements vector comprising the measured articulation angles, for time-step /, and <Pi is a two elements vector comprising the estimated articulation angles using a linear vehicle model, for time step /. Analogously, rt is a three elements vector comprising the recorded yaw rates and ft is a three elements vector comprising the estimated yaw rates using the linear vehicle model. Further, $\varphi$ and Wr are arbitrary diagonal weighting matrices. The recorded steering angles S1: <½ and <⅜ serves as inputs to the linear vehicle model. The summation is made over the complete time series for which recordings have been made.

In the method, either the yaw rate of the towing vehicle and the towed trailers are required, or the articulation angles of the towed trailers are required. One special case is when all elements in Wv are set identically to zero, which means that the articulation angles are no longer part of the optimization. Thus, the measurements of articulation angles are no longer required. Analogously, when all elements in Wr are set identically to zero, which means that the yaw rates are no longer part of the optimization. Thus, the measurements of yaw rates are no longer required. Thus, either the yaw rates or the articulation angles are required in order to obtain a good estimation of the effective wheel bases of the towed trailers. However, using both the yaw rates and the articulation angles may give a result with a higher accuracy.

With the estimated effective wheelbase of each towed trailer, it is possible to perform an automatic reversing with the vehicle combination without knowing the effective wheelbase of each towed trailer in advance. Such estimation is advantageous in that it takes account of the actual properties of the vehicle combination. The effective wheelbase for a trailer will vary e.g. depending on the load and the position of the load. By this method, the effective wheelbase will be adapted to the actual load of a trailer.

Further, when a multiple of different trailers are used at different occasions, the effective wheelbase will be estimated for the actual vehicle combination being used. The driver does not have to measure the different trailers or insert wheelbase values for the specific trailer into the control system.

The estimation can be performed automatically at specific occasion, such as every time the ignition is started, every time the vehicle has been stopped for a predetermined time, when the load has been changed by a predetermined amount, or at specified geographical positions such as loading docks. A further advantage of the method is that all required measures are already known to the control system of the vehicle, except for the articulation angles. Thus, the only required additional component is an articulation sensor for each towed trailer. An articulation sensor may e.g. be integrated in the coupling or the fifth wheel where the following towed trailer is attached to the previous vehicle. A device for measuring the articulation angle can also be placed on the forward vehicle, such as the truck, and can measure from a distance. Thereby it is possible to obtain information about the effective wheelbase of a trailer without providing the trailer with an extra sensor.

Figure 2:
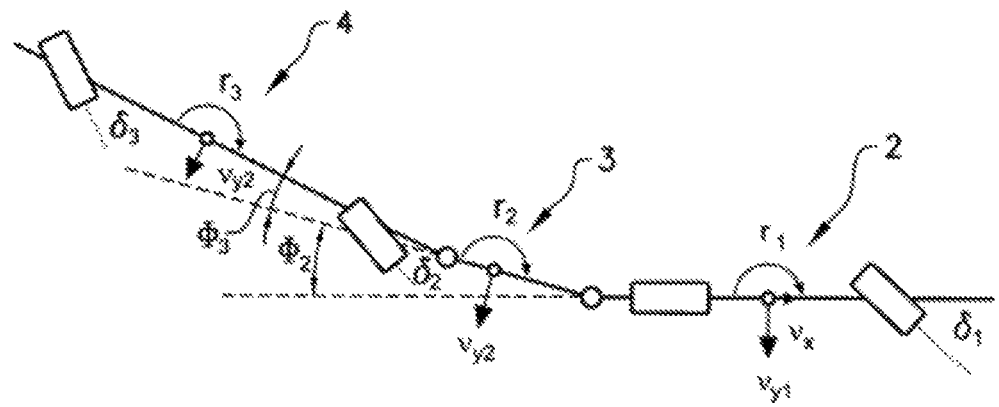
FIG. 2 shows an example of a linear vehicle model.

In FIG. 2, a linear vehicle model of a truck-dolly-semi-trailer vehicle combination is shown. The vehicle combination contains three rigid bodies attached by joints which have one rotational degree of freedom. The following state equations are derived for lateral and yaw motion:

$$m_1(\dot{v}_{y1} + v_x r_1) + \Sigma F_{r1}$$

$$I_{z1}\dot{r}_3 + \Sigma F_{y1}$$

$$m_2(\dot{v}_{y2} + v_x r_2) + \Sigma F_{r2}$$

$$I_{z2}\dot{r}_2 + \Sigma M_{z2}$$

$$m_3(\dot{v}_{y3} + v_x r_3) + \Sigma F_{r3}$$

$$I_{z3}\dot{r}_3 + \Sigma M_{z3}$$

where m, and /z/ is the mass and yaw inertia for unit /. The vyi and η are the lateral velocity and yaw rate of each unit. The total lateral forces and yaw moment are built up by a linear tyre force model. By eliminating the joint forces and the kinematic constrains, a linear vehicle combination model in state space form can be written as $$\dot{x} = Ax + Bu$$

$$u = [\delta_1 \delta_2 \delta_3]$$

$$x = [v_{y1} r_1 v_{y2} r_2 v_{y3} r_3]$$

where u in this case represents the driver steering input, i.e. the steering angle of the truck, the steering angle of the dolly, and steering angle of the semitrailer. The matrixes A and B are depending on forward speed, tyre characteristics and the effective wheelbases. This type of model is well known as a linear one track model for an articulated vehicle. Similar models are extensively used in the field of vehicles and are therefore not described in more detail.

Given the vehicle model, equation (1) can be solved using an existing solver technique, such as e.g. the Monte-Carlo method.

Figure 3:
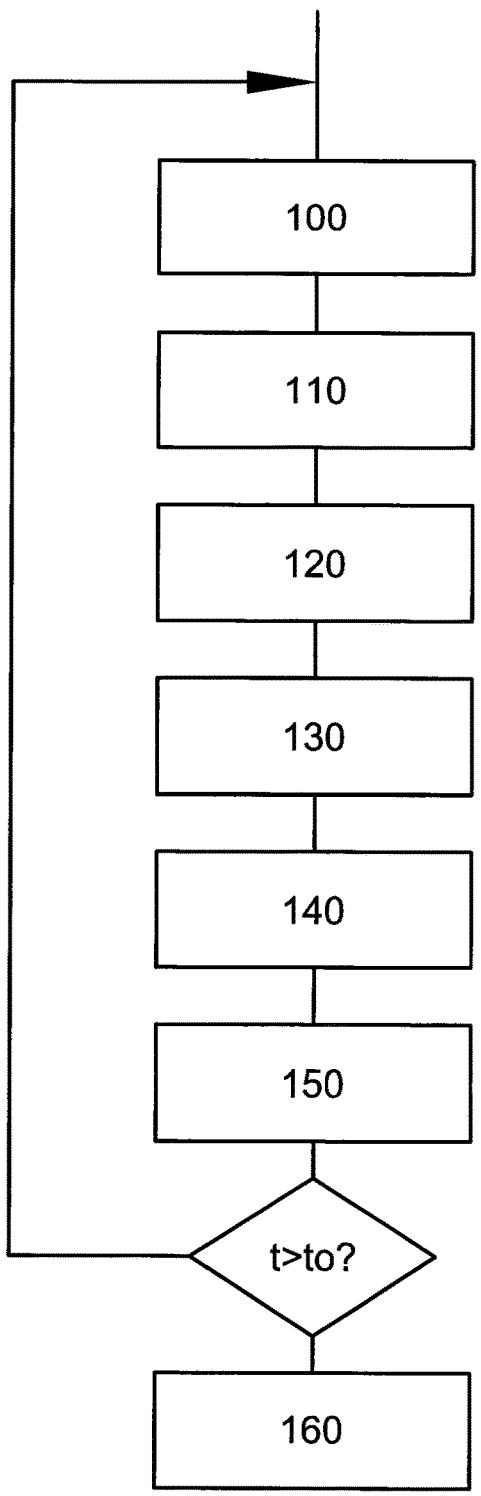
FIG. 3 shows a schematic flow chart of an inventive method for estimating the effective wheelbase of a vehicle combination.

FIG. 3 shows a schematic flow chart of the method for estimating the effective wheelbase length of a trailer in a vehicle combination comprising a towing vehicle and at least one towed trailer. The method is performed while driving the vehicle combination forwards for a predetermined time interval.

In step 100, the speed of the vehicle combination is obtained and recorded. The speed of the truck is known to the control system and is preferably measured by the tachometer.

In step 110, the steering angle of the towing vehicle is recorded. The steering angle is known to the control system of the truck and is preferably measured by a steering angle sensor.

In step 120, the yaw rate of the towing vehicle is recorded. The actual yaw rate can be determined either by measuring the actual yaw rate with a yaw rate sensor or by estimating the actual yaw rate by using other vehicle properties, such as wheel speed and steering angle.

In step 130, the steering angle of each towed trailer is recorded. The steering angle is the angle with which the steerable axle is steered, if the trailer is provided with a steerable axle. If a trailer is not provided with a steerable axle, this value will be set to zero.

In step 140, the articulation angle for each towed trailer is recorded. The articulation angle is the angel of the coupling between two vehicles, and is a measure of the difference between the centre line of the forward vehicle and the following vehicle. The articulation angle can be measured with a specific articulation angle sensor arranged in the coupling, or by using another type of sensor, based e.g. on optical principles.

In step 150, the yaw rate for each towed trailer is recorded. The actual yaw rate can be determined either by measuring the actual yaw rate with a yaw rate sensor or by estimating the actual yaw rate by using other vehicle properties, such as the articulation angles of the towed trailers.

In step 160, a value for the effective wheelbase for each towed trailer is calculated by using the recorded values. The calculation of the effective wheelbase is preferably done by using a least square approximation, although other approximations may also be used.

The steps 100 to 150 are repeated for a predetermined number of times during a predetermined time interval. When the predetermined time interval is ended, the calculation of the effective wheelbase in step 160 may be performed one or several times, using one or more recorded data sets from the measurements. It is e.g. possible to set one or more threshold values for the data set such that only values that will give a good estimation are used. It is e.g. not possible to obtain a good effective wheelbase estimation when an articulation angle is 0.1 degrees, while such a small value may actually be induced by noise or other disturbances. It may thus be preferred to select and pick the recorded data sets that will give an adequate effective wheelbase.

The invention is not to be regarded as being limited to the embodiments described above, a number of additional variants and modifications being possible within the scope of the subsequent patent claims.

REFERENCE SIGNS

1: Vehicle combination
2: Truck
3: Dolly
4: Semitrailer
5: Trailer coupling
6: Dolly virtual axle
7: Dolly axles
8: King pin
9: Semitrailer virtual axle
10: Semitrailer axles

The invention claimed is:

1. A method for estimating an effective wheelbase length of a trailer in a vehicle combination comprising a towing vehicle and at least one towed trailer, comprising:
   driving the vehicle combination forwards,
   recording the speed of the vehicle combination,
   recording the steering angle of the towing vehicle,
   recording the yaw rate of the towing vehicle and of the towed trailers,
   determining the yaw rate of the towed trailers using the recorded yaw rate of the towing vehicle and adding a time derivative of an articulation angle between the towing vehicle and the towed trailers,
   recording the steering angle of each towed trailer,
   using the recorded values and the determined yaw rate to calculate a value for the effective wheelbase for each towed trailer, and
   using the calculated value of the effective wheelbase for each towed trailer to perform one or more autonomous or semi-automatic driving functions.

2. Method according to claim 1, wherein both the yaw rate of the towing vehicle and the towed trailers and the articulation angle for each towed trailer is also recorded.

3. Method according to claim 1, wherein the recorded values are arranged in a data set.

4. Method according to claim 1, wherein a plurality of data sets are recorded.

5. Method according to claim 1, wherein the calculation of the effective wheelbase is done by using a least square fit to a one track linear vehicle model.

6. Method according to claim 5, wherein a plurality of effective wheelbase values are calculated, and that a mean value of the calculated values are used as the effective wheelbase value.

7. Method according to claim 1, wherein the method is repeated every time the ignition of the vehicle is turned on.

8. Method according to claim 1, wherein the method is repeated every time the load of a trailer has changed by a predetermined amount.

9. A computer programmed for performing all the steps of claim 1.

10. A computer program product comprising a program stored on a non-transitory computer readable medium for performing all the steps of claim 1 when the program product is run on a computer.

11. A vehicle combination, comprising
   a towing vehicle and at least one towed trailer,
   an autonomous or semi-automatic driving system for the towing vehicle; and an arrangement for estimating an effective wheelbase length of the trailer, where the arrangement comprises
means for obtaining the speed of the vehicle combination,
means for obtaining the steering angle of the towing vehicle,
means for obtaining the steering angle of each towed trailer,
wherein the arrangement further comprises
means for obtaining the yaw rate of the towing vehicle and each towed trailer, the yaw rate of the towed trailers being obtained using the obtained yaw rate of the towing vehicle and adding a time derivative of an articulation angle between the towing vehicle and the towed trailers, and
means for calculating a value for the effective wheelbase for each towed trailer using the obtained values,
wherein the autonomous or semi-automatic driving system is arranged to use the calculated value of the effective wheelbase for each towed trailer to perform one or more autonomous or semi-automatic driving functions.

12. The vehicle according to claim 11, wherein the arrangement comprises means for obtaining both the yaw rate of the towing vehicle and the towed trailers and the articulation angle for each towed trailer.

13. The vehicle according to claim 11, wherein the means for calculating a value for the effective wheelbase uses a least square fit to a one track linear vehicle model.

14. A method for estimating an effective wheelbase length of a trailer in a vehicle combination comprising a towing vehicle and at least one towed trailer, comprising:
driving the vehicle combination forwards,
recording the speed of the vehicle combination,
recording the steering angle of the towing vehicle,
recording the yaw rate of the towing vehicle,
recording an articulation angle for each towed trailer, wherein the articulation angle for each towed trailer is an angle between a longitudinal center-line of the trailer and a longitudinal center-line of the towing vehicle,
determining the yaw rate of the towed trailers using the recorded yaw rate of the towing vehicle and adding a time derivative of the articulation angle between the towing vehicle and the towed trailers,
recording the steering angle of each towed trailer,
using the recorded values and the determined yaw rate to calculate a value for the effective wheelbase for each towed trailer, and
using the calculated value of the effective wheelbase for each towed trailer to perform one or more autonomous or semi-automatic driving functions.

* * * * *